(12) United States Patent
Nakano et al.

(10) Patent No.: US 10,050,355 B2
(45) Date of Patent: Aug. 14, 2018

(54) CONDUCTIVE MATERIAL, BONDING METHOD USING THE SAME, AND BONDED STRUCTURE

(71) Applicant: MURATA MANUFACTURING CO., LTD., Nagaokakyo-Shi, Kyoto-fu (JP)

(72) Inventors: Kosuke Nakano, Nagaokakyo (JP); Hidekiyo Takaoka, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 13/868,259

(22) Filed: Apr. 23, 2013

(65) Prior Publication Data
US 2013/0233618 A1    Sep. 12, 2013

Related U.S. Application Data

(63) Continuation of application No. PCT/JP2011/054632, filed on Mar. 1, 2011.

(30) Foreign Application Priority Data

Nov. 19, 2010   (JP) .................................. 2010-259131
Feb. 1, 2011    (JP) .................................. 2011-019626

(51) Int. Cl.
*H05K 1/16*     (2006.01)
*H01R 4/02*     (2006.01)
(Continued)

(52) U.S. Cl.
CPC ............. *H01R 4/02* (2013.01); *B22F 1/0059* (2013.01); *B22F 7/064* (2013.01); *B22F 7/08* (2013.01);
(Continued)

(58) Field of Classification Search
CPC ........ B23K 35/0244; B23K 1/00; H01R 4/02; H01L 24/13; H01L 24/32
See application file for complete search history.

(56) References Cited

U.S. PATENT DOCUMENTS 6,872,465 B2    3/2005  Soga et al.
7,682,468 B2    3/2010  Munekata et al.
(Continued)

FOREIGN PATENT DOCUMENTS

CN    1400081 A    3/2003
CN    1442272 A    9/2003
(Continued)

OTHER PUBLICATIONS

Nichiban JP362041280 English summary, Feb. 23, 1987.*
(Continued)

*Primary Examiner* — Steven T Sawyer
(74) *Attorney, Agent, or Firm* — Arent Fox LLP

(57) ABSTRACT

A conductive material that includes a metal component consisting of a first metal and a second metal having a melting point higher than that of the first metal, wherein the first metal is Sn or an alloy containing 70% by weight or more of Sn, and the second metal is a metal or alloy which forms an intermetallic compound having a melting point of 310° C. or higher with the first metal and has a lattice constant difference of 50% or greater between itself and the intermetallic compound generated at the circumference of the second metal.

24 Claims, 4 Drawing Sheets

(51) Int. Cl.

| | | |
|---|---|---|
| *B23K 35/24* | (2006.01) | |
| *B23K 1/00* | (2006.01) | |
| *H01R 4/04* | (2006.01) | |
| *B23K 35/26* | (2006.01) | |
| *B23K 35/30* | (2006.01) | |
| *B22F 1/00* | (2006.01) | |
| *B22F 7/06* | (2006.01) | |
| *B22F 7/08* | (2006.01) | |
| *C22C 1/04* | (2006.01) | |
| *C22C 9/05* | (2006.01) | |
| *C22C 9/06* | (2006.01) | |
| *C22C 13/00* | (2006.01) | |
| *C22C 13/02* | (2006.01) | |
| *B22F 1/02* | (2006.01) | |

(52) U.S. Cl.
CPC ............... *B23K 1/00* (2013.01); *B23K 35/24* (2013.01); *B23K 35/262* (2013.01); *B23K 35/302* (2013.01); *C22C 1/0483* (2013.01); *C22C 1/0491* (2013.01); *C22C 9/05* (2013.01); *C22C 9/06* (2013.01); *C22C 13/00* (2013.01); *C22C 13/02* (2013.01); *H01R 4/04* (2013.01); *B22F 1/025* (2013.01)

(56) References Cited

U.S. PATENT DOCUMENTS

| | | | |
|---|---|---|---|
| 2002/0114726 A1 | 8/2002 | Soga et al. | |
| 2003/0193094 A1* | 10/2003 | Takahashi et al. | 257/780 |
| 2007/0245852 A1* | 10/2007 | Takaoka et al. | 75/255 |
| 2008/0175748 A1* | 7/2008 | Pereira | 420/555 |
| 2009/0220812 A1 | 9/2009 | Kato et al. | |
| 2010/0266870 A1 | 10/2010 | Nishimura | |

FOREIGN PATENT DOCUMENTS

| | | |
|---|---|---|
| CN | 1887500 A | 1/2007 |
| CN | 101575680 A | 11/2009 |
| JP | 2002-254194 A | 9/2002 |
| JP | 2002-254195 A | 9/2002 |
| JP | 2003-211289 A | 7/2003 |
| JP | 2003-260587 A | 9/2003 |
| JP | 2004-247617 A | 9/2004 |
| JP | 2007-237250 A | 9/2007 |
| TW | 201016373 A | 5/2010 |
| TW | 1392557 B1 | 7/2011 |
| WO | WO-2006-075459 A1 | 7/2006 |
| WO | WO-2007-125861 A1 | 11/2007 |
| WO | WO-2009/051181 A1 | 4/2009 |

OTHER PUBLICATIONS

Mitsubishi Metal JP356127742 English summary, Oct. 6, 1981.*
Japanese Office Action issued for counterpart application No. JP-2012-132518, dated Jun. 25, 2013 (with English translation).
PCT/JP2011/054632 Written Opinion dated May 18, 2011.

* cited by examiner

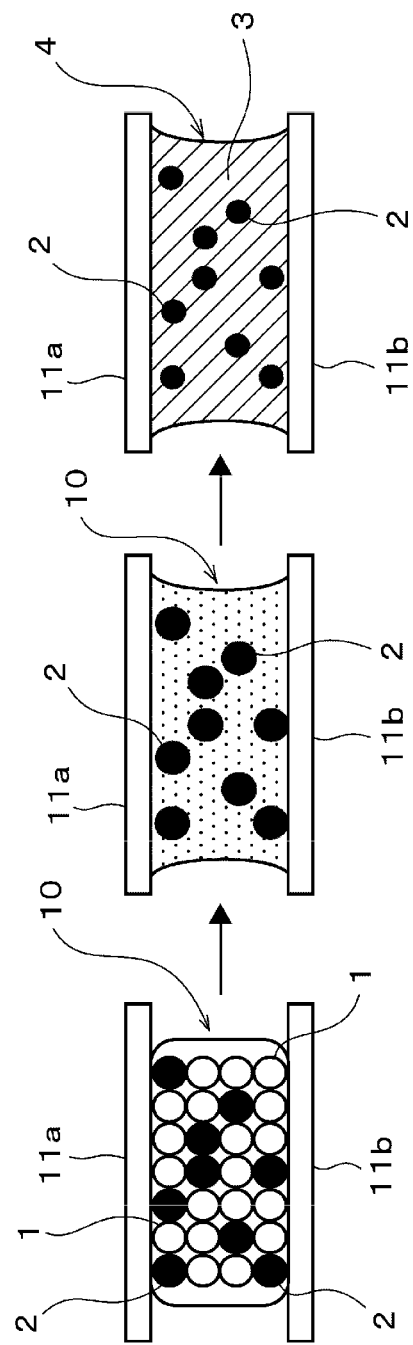

[Fig. 2]
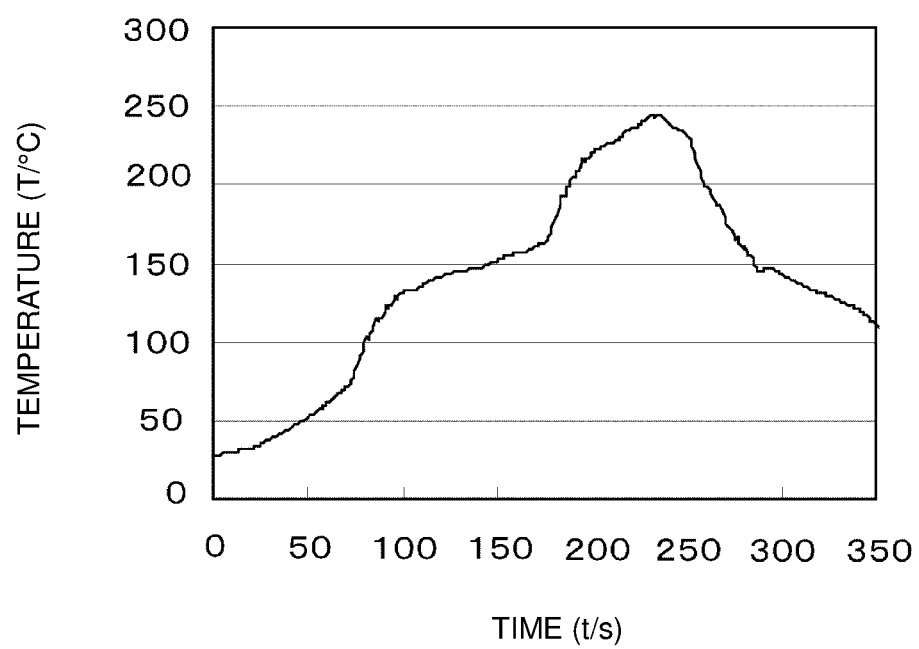

CONDUCTIVE MATERIAL, BONDING METHOD USING THE SAME, AND BONDED STRUCTURE

CROSS REFERENCE TO RELATED APPLICATIONS

The present application is a continuation of International application No. PCT/JP2011/054632, filed Mar. 1, 2011, which claims priority to Japanese Patent Application No. JP2010-259131, filed Nov. 19, 2010, the entire contents of each of which are incorporated herein by reference.

FIELD OF THE INVENTION

The present invention relates to a conductive material, a bonding method using the same, and a bonded structure, and particularly to a conductive material for use in mounting of an electronic component and via bonding, a bonding method using the same and a bonded structure.

BACKGROUND OF THE INVENTION

As a conductive material used for mounting electronic components, solder is widely used.

For Sn—Pb-based solder which has been widely used, methods of bonding with temperature hierarchy are widely applied in which high-temperature solder, for example Pb rich Pb-5Sn (melting point: 314 to 310° C.) or Pb-10Sn (melting point: 302 to 275° C.) is used to solder at a temperature of 330 to 350° C., following by using low-temperature solder, for example an Sn-37Pb eutectic crystal (183° C.) to solder at a temperature equal to or lower than the melting point of the high-temperature solder described above, whereby bonding is established by soldering without melting the high-temperature solder used in the preceding soldering.

Such bonding with temperature hierarchy is applied in, for example, a type of semiconductor devices in which a chip is die-bonded and semiconductor devices for flip-chip bonding, and is an important technique which is used in such a case where bonding is established in a semiconductor device, followed by further bonding the semiconductor device itself to a board by soldering.

As a conductive material for use in this application, for example, a solder paste comprising a mixture of (a) a second metal (or alloy) ball consisting of a second metal such as Cu, Al, Au and Ag or a high-melting point alloy containing those metals and (b) a first metal ball consisting of Sn or In has been proposed (see Patent Document 1).

Patent Document 1 also discloses a bonding method using a solder paste and a method of producing electronic equipment.

When soldering using the solder paste of Patent Document 1, a solder paste containing low-melting point metal (e.g. Sn) balls 51, high-melting point metal (e.g. Cu) balls 52 and a flux 53 as schematically shown in FIG. 4(*a*) is heated and thereby reacted and after soldering, a plurality of high-melting point metal balls 52 are connected together via an intermetallic compound 54 formed between a low-melting point metal derived from the low-melting point metal ball and a high-melting point metal derived from the high-melting point metal ball as shown in FIG. 4(*b*), and an object to be bonded is bonded/connected (soldered) by this connected body.

In the case of the solder paste of Patent document 1, however, a solder paste is heated in a soldering step to thereby generate an intermetallic compound of a high-melting point metal (e.g. Cu) and a low-melting point metal (e.g. Sn), but a combination of Cu (high-melting point metal) and Sn (low-melting point metal) has a low diffusion rate, so that Sn, a low-melting point metal, remains. A solder paste in which Sn remains may suffer a considerable reduction in bonding strength under a high temperature, and become unusable for some kinds of products to be bonded. Furthermore, Sn remaining in the soldering step may be melted to run off in a subsequent soldering step, thus raising a problem of low reliability as high-temperature solder for use in bonding with temperature hierarchy.

That is, for example, if a semiconductor device is produced through a soldering step in a process of producing a semiconductor device, and thereafter the semiconductor device is mounted on a board by a method of reflow soldering, Sn remaining in the soldering step in the process of producing a semiconductor device may be melted to run off in the reflow soldering step.

For forming a low-melting point metal fully into an intermetallic compound so that Sn does not remain, heating at a high temperature and for a long time is required in the soldering step, but it is actually practically impossible in view of productivity.

Patent Document 1: Japanese Patent Application Laid-Open No. 2002-254194

SUMMARY OF THE INVENTION

The present invention solves the problem described above, and an object thereof is to provide a conductive material which can be used as a solder paste and a via filler, wherein the conductive material has a first metal and a second metal whose diffusibility in a soldering step is so good that a high-melting point intermetallic compound is generated at a low temperature and in short time, leaves no low-melting point components after soldering and has excellent strength in high temperature when used as a solder paste for example, and a bonding method and a bonded structure with high bonding reliability using the same.

For solving the problem described above, the conductive material of the present invention is a conductive material comprising a metal component consisting of a first metal and a second metal having a melting point higher than that of the first metal, wherein the first metal is one of Sn and an alloy containing 70% by weight or more of Sn, and the second metal is one of a metal and alloy which forms an intermetallic compound showing a melting point of 310° C. or higher with the first metal and has a lattice constant difference, i.e. a difference between the lattice constant of the intermetallic compound initially generated at the circumference of the second metal and the lattice constant of the second metal component, of 50% or greater.

Particularly, the first metal is preferably one of Sn and an alloy containing 85% by weight or more of Sn.

The conductive material of the present invention preferably contains a flux component.

The ratio of the second metal to the metal component is preferably 30% by volume or greater.

The first metal is preferably one of Sn alone and an alloy containing at least one selected from the group consisting of Cu, Ni, Ag, Au, Sb, Zn, Bi, In, Ge, Al, Co, Mn, Fe, Cr, Mg, Mn, Pd, Si, Sr, Te and P and Sn.

The second metal is preferably one of a Cu—Mn alloy and a Cu—Ni alloy.

The second metal is preferably one of a Cu—Mn alloy in which the ratio of Mn to the second metal is 10 to 15% by weight and a Cu—Ni alloy in which the ratio of Ni to the second metal is 10 to 15% by weight.

The second metal preferably has a specific surface area of 0.05 m$^2$·g$^{-1}$ or greater.

At least a portion of the first metal is preferably coated on the circumference of the second metal.

The bonding method of the present invention is a method of bonding an object to be bonded using a conductive material, wherein all of the first metal constituting the conductive material is formed into an intermetallic compound with the second metal constituting the conductive material by heating to bond the object to be bonded.

The bonded structure of the present invention is a bonded structure in which an object to be bonded is bonded such that a joint, through which the object to be bonded is bonded, has as main components the second metal derived from the conductive material and an intermetallic compound containing the second metal and Sn, and the ratio of the first metal derived from the conductive material to the entire metal component is 30% by volume or less.

In the bonded structure of the present invention, the intermetallic compound is preferably an intermetallic compound formed between one of a Cu—Mn alloy and Cu—Ni alloy, which is the second metal derived from the conductive material, and one of Sn alone and an alloy containing at least one selected from the group consisting of Cu, Ni, Ag, Au, Sb, Zn, Bi, In, Ge, Al, Co, Mn, Fe, Cr, Mg, Mn, Pd, Si, Sr, Te and P and Sn, which is the first metal derived from the conductive material.

The conductive material of the present invention is a conductive material comprising a metal component consisting of a first metal and a second metal having a melting point higher than that of the first metal, wherein the conductive material contains, as a first metal, one of Sn and an alloy containing 70% by weight or more of Sn and contains, as a second metal, one of a metal and alloy which form with the first metal an intermetallic compound having a melting point of 310° C. or higher and in which the lattice constant difference between itself and the intermetallic compound initially generated at the circumference thereof is 50% or greater, so that diffusion of the first metal and the second metal rapidly proceeds, their change into the intermetallic compound having a higher melting point is facilitated and no low-melting point components remain, thus making it possible to establish bonding (e.g. solder when using the conductive material of the present invention as a solder paste) with increased strength in high temperature.

Particularly, with the first metal being Sn or an alloy containing 85% by weight or more of Sn, the effect described above can be more reliably achieved.

That is, for example, by using the conductive material of the present invention, when a semiconductor device is produced through a soldering step in a process of producing a semiconductor device, and thereafter the semiconductor device is mounted on a board by a method of reflow soldering, the soldered part in the previous soldering step has excellent strength in high temperature and therefore is not remelted in the reflow soldering step, thus making it possible to mount the semiconductor device on the board with high reliability.

In the present invention, "lattice constant difference" is defined as a value (%) determined by subtracting the lattice constant of the second metal component from the lattice constant of the intermetallic compound and dividing the obtained value by the lattice constant of the second metal component, followed by multiplying an absolute value of the obtained value by 100.

That is, the lattice constant difference shows a difference between the lattice constant of an intermetallic compound newly generated at the interface with the second metal and the lattice constant of the second metal, and does not consider which lattice constant is greater.

The lattice constant difference is expressed by the following calculation formula:

Lattice constant difference (%)={(Lattice constant of intermetallic compound−Lattice constant of second metal)/Lattice constant of second metal}× 100.

BRIEF ExPLANATION OF THE DRAWINGS

FIGS. 1(a) to 1(c) are views schematically showing behaviors when the conductive material of the present invention is used to establish bonding, wherein FIG. 1(a) shows a situation before heating, FIG. 1(b) shows a situation in which heating is started and a first metal is melted, and FIG. 1(c) shows a situation in which heating is further continued and all of the first metal forms an intermetallic compound with a second metal.

FIG. 2 is a view showing a reflow profile when the conductive material of the present invention is used to mount a brass terminal on an oxygen-free Cu plate.

FIGS. 4(a) and 4(b) are views showing behaviors of solder when a conventional solder paste is used to solder, wherein FIG. 4(a) shows a situation before heating and FIG. 4(b) shows a situation after completion of a soldering step.

DETAILED DESCRIPTION OF THE INVENTION

Figure 3A:
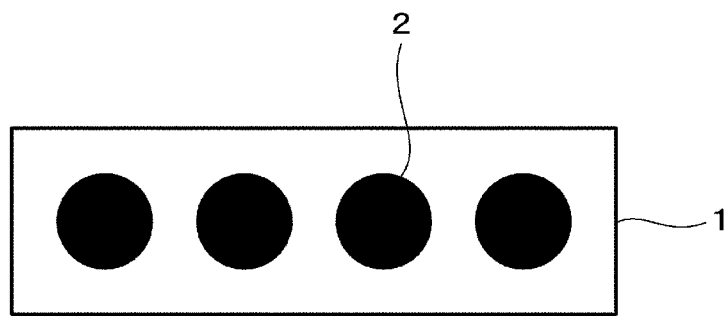
FIGS. 3(a) and 3(b) are each a view schematically showing a configuration of foam solder according to an alternative of the conductive material of the present invention.

FIGS. 1(a) to 1(c) are views schematically showing a behavior when establishing bonding using the conductive material of the present invention.

As shown in FIG. 1(a), when a pair of electrodes 11a and 11b is bonded using the conductive material of the present invention, a conductive material 10 is first placed between a pair of electrodes 11a and 11b.

Next, the joint is heated, and when the temperature of the conductive material 10 reaches the melting point of a first metal 1 (Sn or alloy containing 70% by weight or more of Sn) 1 or higher, the first metal 1 in the conductive material 10 is melted as shown in FIG. 1(b).

Thereafter, heating further continues, and the first metal 1 forms an intermetallic compound 3 with a second metal 2 (FIG. 1(c)). Since the conductive material 10 of the present invention has a large lattice constant difference between the intermetallic compound 3 generated at the interface between the first metal 1 and the second metal 2 and the second metal 2 (i.e. the lattice constant difference between the second metal 2 and the intermetallic compound 3 is 50% or greater), the intermetallic compound is repeatedly reacted while separating and diffusing in the molten first metal, generation of the intermetallic compound rapidly proceeds and the content of the first metal 1 can be rapidly reduced in short time sufficiently (FIGS. 1(a), 1(b)). Further, by optimizing the composition ratio of the first metal 1 and the second metal 2, all the first metal 1 can be formed into the intermetallic compound as shown in FIG. 1(c).

As a result, soldering with increased strength in high temperature is possible.

By ensuring that the ratio of the second metal to the metal component consisting of the first metal and the second metal is 30% by volume or greater, the ratio of remaining Sn in the soldering step can be further reduced to further improve heat resistance.

By using, as the first metal, Sn alone or an alloy containing at least one selected from the group consisting of Cu, Ni, Ag, Au, Sb, Zn, Bi, In, Ge, Al, Co, Mn, Fe, Cr, Mg, Mn, Pd, Si, Sr, Te and P and Sn, the intermetallic compound can be easily formed with the other metal (second metal), and the present invention can be made more effective.

By using, as the second metal, a Cu—Mn alloy or a Cu—Ni alloy, particularly a Cu—Mn alloy with the ratio of Mn of 10 to 15% by weight or a Cu—Ni alloy with the ratio of Ni of 10 to 15% by weight, the intermetallic compound can be easily formed with the first metal at a lower temperature and in shorter time, and prevented from being melted in a subsequent reflow step.

The second metal may contain impurities at a level in which the reaction with the first metal is not hindered, for example, at a ratio of 1% by weight or less. Examples of the impurities include Zn, Ge, Ti, Sn, Al, Be, Sb, In, Ga, Si, Ag, Mg, La, P, Pr, Th, Zr, B, Pd, Pt, Ni and Au.

When considering bonding characteristics and reactivity, the concentration of oxygen in the first and second metal is preferably 2000 ppm or less, especially preferably 10 to 1000 ppm.

By using, as the second metal, one having a specific surface area of $0.05\ m^2 \cdot g^{-1}$ or greater, the probability of contact with the first metal increases, so that the intermetallic compound can be further easily formed with the first metal, thus making it possible to complete melting point elevation with a common reflow profile.

By coating at least a portion of the first metal on the circumference of the second metal, the intermetallic compound can be further easily formed between the first metal and the second metal, and the present invention can be made more effective.

In addition, the conductive material of the present invention can contain a flux.

The flux performs the function of removing an oxide film on the surface of an object to be bonded and a metal. For the conductive material of the present invention, various kinds of well-known materials including, for example, a vehicle, a solvent, a thixotropic agent, an activator or the like can be used as a flux.

Specific examples of the vehicle include rosin-based resins and synthetic resins consisting of a rosin and a derivative such as a modified rosin obtained by modifying the rosin, or mixtures thereof.

Specific examples of the rosin-based resin consisting of a resin and a derivative such as a modified rosin obtained by modifying the rosin include gum rosins, tall rosins, wood rosins, polymerized rosins, hydrogenated rosins, formylated rosins, rosin esters, rosin modified maleic resins, rosin modified phenol resins, rosin modified alkyd resins and various kinds of other rosin derivatives.

Specific examples of the synthetic resin consisting of a resin and a derivative such as a modified rosin obtained by modifying the rosin include polyester resins, polyamide resins, phenoxy resins and terpen resins.

As the solvent, alcohols, ketones, esters, ethers, aromatics, hydrocarbons and the like are known, and specific examples include benzyl alcohol, ethanol, isopropyl alcohol, butanol, diethylene glycol, ethylene glycol, glycerin, ethyl cellosolve, butyl cellosolve, ethyl acetate, butyl acetate, butyl benzoate, diethyl adipate, dodecane, tetracene, α-terpineol, terpineol, 2-methyl 2,4-pentanediol, 2-ethyl hexanediol, toluene, xylene, propylene glycol monophenyl ether, diethylene glycol monohexyl ether, ethylene glycol monobutyl ether, diethylene glycol monobutyl ether, diisobutyl adipate, hexylene glycol, cyclohexane dimethanol, 2-terpinyloxy ethanol, 2-dihydroterpinyloxy ethanol and mixtures thereof.

Specific examples of the thixotropic agent include hardened castor oil, carnauba wax, amides, hydroxy fatty acids, dibenzylidene sorbitol, bis(p-methylbenzylidene)sorbitols, bees wax, amide stearate and ethylenebisamide hydroxystearate. Materials obtained by adding to the above-mentioned substances, a fatty acid such as caprylic acid, lauric acid, myristic acid, palmitic acid, stearic acid and behenic acid, a hydroxy fatty acid such as 1,2-hydroxystearic acid, an antioxidant, a surfactant, an amine and the like as required may also be used as the thixotropic agent.

Examples of the activators include halide acid salts of amine, organic halogen compounds, organic acids, organic amines and polyvalent alcohols, and specific examples of the halide acid salt of amine include diphenylguanidine hydrobromide, diphenylguanidine hydrochloride, cyclohexylamine hydrobromide, ethylamine hydrochloride, ethylamine hydrobromide, diethylaniline hydrobromide, diethylaniline hydrochloride, triethanolamine halide acid salts, and monoethanolamine hydrobromide.

Specific examples of the organic halogen compound include chlorinated paraffin, tetrabromoethane, dibromopropanol, 2,3-dibromo-1,4-butanediol, 2,3-dibromo-2-butene-1,4-diol and tris(2,3-dibromopropyl)isocyanurate.

Specific examples of the organic acid include malonic acid, fumaric acid, glycolic acid, citric acid, malic acid, succinic acid, phenylsuccinic acid, maleic acid, salicylic acid, anthranilic acid, glutaric acid, suberic acid, adipic acid, sebacic acid, stearic acid, abietic acid, benzoic acid, trimellitic acid, pyromellitic acid and dodecanoic acid, and specific examples of the organic amine include monoethanolamine, diethanolamine, triethanolamine, tributylamine, aniline and diethylaniline.

Examples of the polyvalent alcohol include erythritol, pyrogallol and ribitol.

The action effect of the present invention can also be further reliably achieved when using, as the flux, one containing one of at least one selected from the thermosetting resin group consisting of an epoxy resin, a phenol resin, a polyimide resin, a silicon resin, a derivative of the silicon resin, and an acryl resin, and at least one selected from the thermoplastic resin group consisting of a polyamide resin, a polystyrene resin, a polymethacryl resin, a polycarbonate resin and a cellulose resin.

As described above, the flux performs the function of removing an oxide film on the surfaces of an object to be bonded and a metal, and therefore the conductive material of the present invention preferably contains a flux. The flux is preferably contained at a ratio of 7 to 15% by weight based on the total amount of the conductive material.

However, the conductive material of the present invention is not necessarily required to contain a flux, and can be applied to a bonding technique which does not require a flux and by, for example, a method of heating under pressure or a method of heating in a strong reducing atmosphere, the oxide film on the surfaces of the object to be bonded and the metal can be removed to establish bonding with high reliability.

In the bonding method of the present invention, using the conductive material of the present invention, a low-melting point metal constituting the conductive material is heated and formed into an intermetallic compound with the second metal constituting conductive material to bond an object to be bonded, so that diffusion of the first metal and the second metal rapidly proceeds in a step of bonding the object to be bonded (soldering step when the conductive material is used as a solder paste), their change into an intermetallic compound having a higher melting point is facilitated and the ratio of the first metal component to the entire metal component is, for example, 30% by volume or less, thus making it possible to solder with increased strength in high temperature.

Further, by optimizing the metal compounding ratio in the conductive material and the like, the conductive material can be designed such that the first metal component does not remain at all.

That is, for example, by using the conductive material of the present invention, when a semiconductor device is produced through a soldering step in a process of producing a semiconductor device, and thereafter the semiconductor device is mounted on a board by a method of reflow soldering, the soldered part in the previous soldering step has excellent strength in high temperature and therefore is not remelted in the reflow soldering step, thus making it possible to mount the semiconductor device on the board with high reliability.

In the bonded structure of the present invention, a joint, through which an object to be bonded is bonded, has as main components the second metal derived from the conductive material and an intermetallic compound containing the second metal and Sn, and represents 30% by volume or less of the entire metal component of the first metal derived from the conductive material, thus making it possible to provide a bonded structure with increased strength in high temperature.

The ratio of the first metal derived from the conductive material in the joint is further preferably 30% by volume or less.

For the bonded structure of the present invention, as shown in FIG. 1(c), in a joint (solder) 4, through which objects to be bonded (electrodes) 11a and 11b are bonded, all of the first metal forms an intermetallic compound 3 with the second metal, so that the joint 4 is constituted by the second metal 2 and the intermetallic compound 3 and no first metal 1 remains (FIGS. 1(a), 1(b)), thus making it possible to achieve a bonded structure with increased strength in high temperature.

When the intermetallic compound is an intermetallic compound formed between a Cu—Mn alloy or Cu—Ni alloy, which is the second metal derived from the conductive material, and Sn alone or an alloy containing at least one selected from the group consisting of Cu, Ni, Ag, Au, Sb, Zn, Bi, In, Ge, Al, Co, Mn, Fe, Cr, Mg, Mn, Pd, Si, Sr, Te and P and Sn, which is the first metal derived from the conductive material, a bonded structure in which almost no first metal component remains and which has increased strength in high temperature can be provided more reliably.

Examples are shown below to describe features of the present invention further in detail.

Example 1

In this Example 1, a conductive material was prepared by mixing a powdered first metal (first metal powder), a powdered second metal (second metal powder) and a flux.

The compounding ratio of the first metal powder and the second metal powder was adjusted so that the volume ratio of the first metal powder/second metal powder was 60/40 (i.e. second metal: 40% by volume).

As the first metal powder, Sn-3Ag-0.5Cu, Sn, Sn-3.5Ag, Sn-0.75Cu, Sn-0.7Cu-0.05Ni, Sn-5Sb, Sn-2Ag-0.5Cu-2Bi, Sn-3.5Ag-0.5Bi-8In, Sn-9Zn, Sn-8Zn-3Bi, Sn-10Bi, Sn-15Bi, Sn-20Bi, Sn-30Bi, Sn-40Bi (Comparative Example), Sn-58Bi (Comparative Example) were used as shown in Table 1. The average particle size of the first metal powder was 25 μm.

Sn-40Bi and Sn-58Bi of the first metals described above are those of Comparative Examples which do not meet the requirement of the present invention that is "an alloy containing 70% by weight or more of Sn".

In addition, Sn-3Ag-0.5Cu of the first metal was used not only as Example, but also as Comparative Example, but in the case of Comparative Example, this first metal is combined with Cu or Cu-10Zn, and the requirement of the present invention for the lattice constant difference is not met.

In writing of each material described above, for example, the digit (3.5) of "Sn-3.5Ag" represents a value in % by weight of a component concerned (Ag in this case), and the same applies to other materials described above and those described below.

As the second metal powder, Cu-10Ni, Cu-10Mn, Cu-12Mn-4Ni, Cu-10Mn-1P, a mixed powder of equal amounts of Cu-10Ni and Cu-10Mn, Cu, and Cu-10Zn were used as shown in Table 1. The average particle size of the second metal powder was 15 μm.

As the flux, one having a compounding ratio of rosin: 74% by weight, diethylene glycol monobutyl ether: 22% by weight, triethanolamine: 2% by weight and hydrogenated castor oil: 2% by weight was used.

For the compounding ratio of the flux, the ratio of the flux to the entire conductive material was 10% by weight.

The prepared conductive material was printed on an oxygen-free Cu plate having a size of 10 mm×10 mm and a thickness of 0.2 mm using a metal mask. The opening size of the metal mask was 1.5 mm×1.5 mm and the thickness was 100 μm.

A brass terminal (size: 1.2 mm×1.0 mm×1.0 mm) plated with Ni and plated with Au was mounted on the printed conductive material, and thereafter using a reflow apparatus, the oxygen-free Cu plate and the brass terminal are joined with a reflow profile shown in FIG. 2 and bonded electrically and mechanically.

In this Example 1, the conductive material is used substantially as a solder paste.

[Evaluation of Characteristics]

For samples prepared as described above, the bonding strength and the conductive material (solder) runoff failure rate were measured to evaluate the characteristics.

<<Bonding Strength>>

The shear strength of the obtained joined body was measured using a bonding tester and evaluated.

Measurements of the shear strength were made at a side push speed of 0.1 mm·s$^{-1}$ at room temperature and 260° C.

Samples having a shear strength of 20 Nmm$^{-2}$ or greater were rated as ☉ (excellent) and those having a shear strength of 2 Nmm$^{-2}$ or less were rated as x (failure).

Table 1 shows the compositions of the first metal and the second metal, the lattice constant of the second metal, the compounding ratio of the first metal and the second metal, the type and the lattice constant of an intermetallic compound initially generated at the surface of the second metal powder, the lattice constant difference between the second metal (Cu alloy) and the intermetallic compound and the bonding strength of each joined body (room temperature and 260° C.). The lattice constant was evaluated on the basis of the a axis.

<<Evaluation of Remaining Components>>

About 7 mg of the reaction product obtained was cut off and subjected to differential scanning calorimetry (DSC measurement) under conditions of a measurement temperature of 30° C. to 300° C., a temperature rise rate of 5° C./min, $N_2$ atmosphere and a reference of $Al_2O_3$. The amount of remaining first metal component was quantified from the amount of absorbed heat in the melt heat absorption peak at the melt temperature of the first metal component in the DSC chart obtained. Thus, the ratio of the first metal component to the entire metal component was evaluated as a remaining first metal component rate. Samples having a remaining first metal component rate of 0 to 3% by volume were rated as ⊙ (excellent), those having a remaining first metal component rate greater than 3% by volume and equal to or less than 30% by volume were rated as ○ (good) and those having a remaining first metal component rate greater than 30% by volume were rated as x (failure).

Table 1 shows both the remaining first metal component rate and evaluation results.

<<Measurement and Evaluation of Conductive Material Runoff failure rate>>

A Cu land of a printed board (Cu land size: 0.7 mm×0.4 mm) was coated with the conductive material (thickness of 100 μm) and a chip type ceramic condenser having a length of 1 mm, a width of 0.5 mm and a thickness of 0.5 mm was mounted on the obtained coated part.

After reflowing at a peak temperature of 250° C. to join (solder) the Cu land and the ceramic condenser, the printed board was sealed with an epoxy resin, left to stand in an atmosphere with a relative humidity of 85% and heated under reflow conditions at a peak temperature of 260° C. to examine a rate at which the conductive material (solder) ran off, and the rate was evaluated as a runoff failure rate.

Samples having a conductive material runoff failure rate of 0 to 10% were rated as ⊙ (excellent), those having a conductive material runoff failure rate greater than 10% and equal to or less than 50% were rated as ○ (good) and those having a conductive material runoff failure rate greater than 50% were rated as x (failure).

Table 1 shows both the conductive material runoff failure rate and evaluation results.

TABLE 1

| | First metal component (60% by volume) | Second metal component (40% by volume) Composition | Second metal component Lattice constant a (nm) | Intermetallic compound generated at interface Composition | Intermetallic compound Lattice constant a (nm) | Lattice constant difference between Cu alloy and compound (%) | Evaluation of bonding strength (room temperature) Bonding strength (Nmm$^{-2}$) | Evaluation | Evaluation of bonding strength (260° C.) Bonding strength (Nmm$^{-2}$) | Evaluation | Evaluation of remaining components Remaining first metal component rate (% by volume) | Evaluation | Evaluation of runoff Runoff failure rate (%) | Evaluation |
|---|---|---|---|---|---|---|---|---|---|---|---|---|---|---|
| Examples | Sn—3Ag—0.5Cu | Cu—10Ni | 0.357 | Cu$_2$NiSn | 0.597 | 67 | 28 | ◎ | 25 | ◎ | 0 | ◎ | 0 | ◎ |
| | Sn | Cu—10Mn | 0.367 | Cu$_2$MnSn | 0.617 | 68 | 28 | ◎ | 24 | ◎ | 0 | ◎ | 0 | ◎ |
| | Sn—3.5Ag | Cu—10Mn | 0.367 | Cu$_2$MnSn | 0.617 | 68 | 29 | ◎ | 24 | ◎ | 0 | ◎ | 0 | ◎ |
| | Sn—0.75Cu | Cu—10Mn | 0.367 | Cu$_2$MnSn | 0.617 | 68 | 27 | ◎ | 22 | ◎ | 0 | ◎ | 0 | ◎ |
| | Sn—0.7Cu—0.05Ni | Cu—10Mn | 0.367 | Cu$_2$MnSn | 0.617 | 68 | 27 | ◎ | 24 | ◎ | 0 | ◎ | 0 | ◎ |
| | Sn—5Sb | Cu—10Mn | 0.367 | Cu$_2$MnSn | 0.617 | 68 | 28 | ◎ | 24 | ◎ | 0 | ◎ | 0 | ◎ |
| | Sn—2Ag—0.5Cu—2Bi | Cu—10Mn | 0.367 | Cu$_2$MnSn | 0.617 | 68 | 30 | ◎ | 26 | ◎ | 0 | ◎ | 0 | ◎ |
| | Sn—3.5Ag—0.5Bi—8In | Cu—10Mn | 0.367 | Cu$_2$MnSn | 0.617 | 68 | 29 | ◎ | 26 | ◎ | 0 | ◎ | 0 | ◎ |
| | Sn—9Zn | Cu—10Mn | 0.367 | Cu$_2$MnSn | 0.617 | 68 | 28 | ◎ | 24 | ◎ | 0 | ◎ | 0 | ◎ |
| | Sn—8Zn—3Bi | Cu—10Mn | 0.367 | Cu$_2$MnSn | 0.617 | 68 | 27 | ◎ | 25 | ◎ | 0 | ◎ | 0 | ◎ |
| | Sn—10Bi | Cu—10Mn | 0.367 | Cu$_2$MnSn | 0.617 | 68 | 27 | ◎ | 26 | ◎ | 0 | ◎ | 0 | ◎ |
| | Sn—15Bi | Cu—10Mn | 0.367 | Cu$_2$MnSn | 0.617 | 68 | 28 | ◎ | 25 | ◎ | 0 | ◎ | 0 | ◎ |
| | Sn—20Bi | Cu—10Mn | 0.367 | Cu$_2$MnSn | 0.617 | 68 | 28 | ◎ | 25 | ◎ | 0 | ◎ | 0 | ◎ |
| | Sn—30Bi | Cu—10Mn | 0.367 | Cu$_2$MnSn | 0.617 | 68 | 29 | ◎ | 21 | ◎ | 11 | ◎ | 12 | ○ |
| | Sn—3Ag—0.5Cu | Cu—12Mn—4Ni | 0.367 | Cu$_2$MnSn | 0.617 | 68 | 28 | ◎ | 23 | ◎ | 15 | ○ | 20 | ○ |
| | | Cu—10Mn—1P | 0.367 | Cu$_2$MnSn | 0.617 | 68 | 29 | ◎ | 23 | ◎ | 0 | ◎ | 0 | ◎ |
| | | Cu—10Ni (20% by volume) | 0.352 | Cu$_2$NiSn | 0.597 | 67 | 28 | ◎ | 25 | ◎ | 0 | ◎ | 0 | ◎ |
| | | Cu—10Mn (20% by volume) | 0.367 | Cu$_2$MnSn | 0.617 | 68 | | | | | | | | |
| Comparative Examples | Sn—3Ag—0.5Cu | Cu | 0.361 | Cu$_3$Sn | 0.432 | 20 | 25 | ◎ | 0.1 | X | 31 | X | 75 | X |
| | | Cu—10Zn | 0.359 | Cu$_3$Sn | 0.432 | 20 | 31 | ◎ | 1.8 | X | 34 | X | 70 | X |
| | Sn—40Bi | Cu—10Mn | 0.367 | Cu$_3$Sn | 0.432 | 18 | 28 | ◎ | 2.0 | X | 32 | X | 71 | X |
| | Sn—58Bi | Cu—10Mn | 0.357 | Cu$_3$Sn | 0.432 | 21 | 27 | ◎ | 0.2 | X | 36 | X | 76 | X |

As shown in Table 1, for the bonding strength at room temperature, both Examples and Comparative Examples showed a bonding strength of 20 Nmm$^{-2}$ or greater and were found to have a practical strength.

On the other hand, for the bonding strength at 260° C., Comparative Examples had an insufficient bonding strength of 2 Nmm$^{-2}$ or less, while Examples retained a bonding strength of 10 Nmm$^{-2}$ or greater and were found to have a practical strength.

For the remaining first metal component rate, Comparative Examples had a rate greater than 30% by volume while Examples all had a rate of 30% by volume or less, and for the conductive material runoff failure rate, Comparative Examples had a rate of 70% or greater while Examples all had a rate of 50% or less and were found to have high heat resistance.

Samples of Examples were found to have comparable high heat resistance irrespective of the type of the first metal as long as the first metal was an alloy containing 70% by weight or more of Sn. Particularly, when the first metal was Sn or an alloy containing 85% by weight or more of Sn, the remaining first metal component rate could be reduced to 0% by volume, and the conductive material had a runoff failure rate of 0% and was found to have especially high heat resistance.

Moreover, samples of Examples were found to have comparably high heat resistance as well when the second metal was a metal based on Cu—Mn (Cu-12Mn-4Ni and Cu-10Mn-1P, etc.) and the second metal powder were of two or more types (Cu—Mn, Cu—Ni mixed powder).

It can be considered that the reason why samples of Examples thus have high heat resistance is that for Examples using Cu—Mn and Cu—Ni based alloys as the second metal, intermetallic compounds are Cu$_2$MnSn and Cu$_2$NiSn, respectively, and the lattice constant difference between each intermetallic compound and the second metal (Cu alloy) is 50% or greater. In other words, it can be considered that this is because if the lattice constant difference between an intermetallic compound layer generated and the second metal which is a base metal is large, the intermetallic compound is repeatedly reacted while separating and diffusing in the molten first metal, and therefore formation of the intermetallic compound rapidly proceeds.

On the other hand, it can be considered that when a Cu or Cu—Zn alloy is used as the second metal as in Comparative Examples, the intermetallic compound at the bonding interface is Cu$_3$Sn, the lattice constant difference between the intermetallic compound and the second metal (Cu alloy) is as small as 20%, formation of the intermetallic compound does not efficiently proceed, and therefore high heat resistance cannot be obtained.

Further, it can be considered that the reason why high heat resistance could not be obtained by a combination of Sn-40Bi or Sn-58Bi with Cu-10MnNi is that with a composition in which the compounding ratio of Sn in the first metal is less than 70% by weight, an intermetallic compound layer initially generated at the interface is Cu$_3$Sn and the lattice constant difference between the intermetallic compound and the second metal (Cu alloy) is not 50% or greater. Thus, it is required that the content of Sn in an alloy as the first metal be 70% by weight or greater.

Example 2

A powder of Sn-3Ag-0.5Cu was prepared as the first metal powder. The average particle size of the first metal powder was 25 μm.

Powders of Cu-10Mn, Cu-10Ni and Cu (Comparative Example) were prepared as the second metal powder. The average particle size of the second metal powder was 15 μm.

As the flux, one having a compounding ratio of rosin: 74% by weight, diethylene glycol monobutyl ether: 22% by weight, triethanolamine: 2% by weight and hydrogenated castor oil: 2% by weight was prepared.

A conductive material was prepared by mixing the above-mentioned first metal powder, second metal powder and flux.

The compounding ratio of the first metal powder and the second metal powder was adjusted so that the volume ratio of the first metal powder/second metal powder was 87/13 to 57/43 (i.e. second metal powder: 13 to 43% by volume).

For the compounding ratio of the flux, the ratio of the flux to the entire conductive material was 10% by weight.

For the conductive material thus prepared, the bonding strength and the conductive material runoff failure rate were measured in the same manner as in Example 1 to evaluate characteristics.

For evaluation of the bonding strength, samples having a shear strength of 20 Nmm$^{-2}$ or greater were rated as ⊙ (excellent), those having a shear strength equal to or greater than 2 Nmm$^{-2}$ and less than 20 Nmm$^{-2}$ were rated as ◯ (good) and those having a shear strength of 2 Nmm$^{-2}$ or less were rated as x (failure).

For the remaining first metal component rate, samples having a rate of 0 to 3% by volume were rated as ⊙ (excellent), those having a rate greater than 3% by volume and equal to or less than 30% by volume were rated as ◯ (good) and those having a rate greater than 30% by volume were rated as x (failure).

For the conductive material runoff failure rate, samples having a rate of 0 to 10% were rated as ⊙ (excellent), those having a rate greater than 10% and equal to or less than 50% were rated as ◯ (good) and those having a rate greater than 50% were rated as x (failure).

Table 2 shows the bonding strength of each joined body (room temperature, 260° C.), the remaining first metal component rate, the conductive material runoff failure rate and the evaluation results thereof.

TABLE 2

| | Metal components in solder paste | | Evaluation of bonding strength (room temperature) | | Evaluation of bonding strength (260° C.) | | Evaluation of remaining components | | Evaluation of runoff | |
|---|---|---|---|---|---|---|---|---|---|---|
| | Ratio of first metal component Sn—3Ag—0.5Cu (% by volume) | Ratio of second metal component (% by volume) | Bonding strength (Nmm$^{-2}$) | Evaluation | Bonding strength (Nmm$^{-2}$) | Evaluation | Remaining first metal component rate (% by volume) | Evaluation | Runoff failure rate (%) | Evaluation |
| Examples | 57.1 | Cu—10Mn 42.9 | 25 | ⊙ | 23 | ⊙ | 0 | ⊙ | 0 | ⊙ |
| | 66.7 | 33.3 | 28 | ⊙ | 24 | ⊙ | 0 | ⊙ | 0 | ⊙ |
| | 70.0 | 30.0 | 30 | ⊙ | 26 | ⊙ | 0 | ⊙ | 0 | ⊙ |
| | 72.7 | 27.3 | 31 | ⊙ | 16 | ○ | 11 | ○ | 11 | ○ |
| | 79.9 | 20.1 | 29 | ⊙ | 11 | ○ | 16 | ○ | 14 | ○ |
| | 84.2 | 15.8 | 27 | ⊙ | 9 | ○ | 21 | ○ | 21 | ○ |
| | 86.9 | 13.1 | 27 | ⊙ | 7 | ○ | 26 | ○ | 49 | ○ |
| | 63.1 | Cu—10Ni 36.9 | 30 | ⊙ | 27 | ⊙ | 0 | ⊙ | 0 | ⊙ |
| | 70.0 | 30.0 | 33 | ⊙ | 29 | ⊙ | 0 | ⊙ | 0 | ⊙ |
| | 83.7 | 16.3 | 27 | ⊙ | 8 | ○ | 23 | ○ | 30 | ○ |
| Comparative Examples | 57.1 | Cu 42.9 | 25 | ⊙ | 0.1 | X | 31 | X | 75 | X |
| | 66.7 | 33.3 | 25 | ⊙ | 0.1 | X | 40 | X | 71 | X |
| | 72.7 | 27.3 | 29 | ⊙ | 0.1 | X | 47 | X | 80 | X |
| | 79.9 | 20.1 | 29 | ⊙ | 0.1 | X | 53 | X | 79 | X |
| | 84.2 | 15.8 | 30 | ⊙ | 0.1 | X | 60 | X | 81 | X |
| | 86.9 | 13.1 | 28 | ⊙ | 0.1 | X | 74 | X | 85 | X |

As shown in Table 2, for the bonding strength at room temperature, both Examples and Comparative Examples showed a bonding strength of 20 Nmm$^{-2}$ or greater and were found to have a practical strength.

On the other hand, for the bonding strength at 260° C., Comparative Examples had an insufficient bonding strength of 0.1 Nmm$^{-2}$, far below 2 Nmm$^{-2}$, while Examples retained a bonding strength of 7 to 29 Nmm$^{-2}$, greater than 2 Nmm$^{-2}$, and were found to have a practical strength. Particularly, Examples showed a bonding strength of 23 Nmm$^{-2}$ or greater and were found to have increased strength in high temperature when the second metal was Cu-10Mn and its ratio was 30% by volume or greater. Particularly, Examples showed a bonding strength of 27 Nmm$^{-2}$ or greater and were found to have increased strength in high temperature when the second metal was Cu-10Ni and its ratio was 30% by volume or greater.

For the remaining first metal component rate, Comparative Examples had a rate greater than 30% by volume while Examples all had a rate of 30% by volume or less, and Examples had a remaining first metal component rate of 0% by volume when the ratio of Cu-10Mn or Cu-10Ni, i.e. the second metal, was 30% by volume or greater. For the conductive material runoff failure rate, Comparative Examples had a rate of 70% or greater while Examples all had a rate of 50% or less, and further Examples had a conductive material runoff failure rate of 0% when the ratio of Cu-10Mn or Cu-10Ni, i.e. the second metal, was 30% by volume or greater, and Examples were found to have high heat resistance.

Example 3

A powder of Sn-3Ag-0.5Cu was prepared as the first metal powder. The average particle size of the first metal powder was 25 μm.

As the second metal powder, a powder of a Cu—Mn alloy with the ratio of Mn of 5 to 30% by weight and a powder of a Cu—Ni alloy with the ratio of Ni of 5 to 20% by weight were prepared, and a Cu powder was prepared as Comparative Example. The average particle size of the second metal powder was 15 μm.

As the flux, one having a compounding ratio of rosin: 74% by weight, diethylene glycol monobutyl ether: 22% by weight, triethanolamine: 2% by weight and hydrogenated castor oil: 2% by weight was prepared.

A conductive material was prepared by mixing the above-mentioned first metal powder, second metal powder and flux.

For the compounding ratio of the flux, the ratio of the flux to the entire conductive material was 10% by weight.

The compounding ratio of the first metal powder and the second metal powder was adjusted so that the volume ratio of the first metal powder/second metal powder was 60/40 (i.e. second metal powder: 40% by volume).

For the conductive material thus prepared, the bonding strength, the remaining first metal component rate and the conductive material runoff failure rate were measured in the same manner as in Example 1 to evaluate characteristics.

Evaluations of the bonding strength, the remaining first metal component rate and the conductive material runoff failure rate were carried out on the basis of the same criteria as in Example 2.

Table 3 shows the bonding strength of each joined body (room temperature, 260° C.), the remaining first metal component rate, the conductive material runoff failure rate and the evaluation results thereof.

TABLE 3

| | First metal component (60% by volume) | Second metal component (40% by volume) | Evaluation of bonding strength (room temperature) Bonding strength (Nmm⁻²) | Evaluation | Evaluation of bonding strength (260° C.) Bonding strength (Nmm⁻²) | Evaluation | Evaluation of remaining components Remaining first metal component rate (% by volume) | Evaluation | Evaluation of runoff Runoff failure rate (%) | Evaluation |
|---|---|---|---|---|---|---|---|---|---|---|
| Examples | Sn—3Ag—0.5Cu | Cu—5Mn | 28 | ☉ | 6 | ○ | 19 | ○ | 32 | ○ |
| | | Cu—10Mn | 27 | ☉ | 24 | ☉ | 0 | ☉ | 0 | ☉ |
| | | Cu—15Mn | 28 | ☉ | 25 | ☉ | 0 | ☉ | 0 | ☉ |
| | | Cu—20Mn | 30 | ☉ | 12 | ○ | 9 | ○ | 15 | ○ |
| | | Cu—30Mn | 31 | ☉ | 5 | ○ | 21 | ○ | 35 | ○ |
| | | Cu—5Ni | 28 | ☉ | 8 | ○ | 12 | ○ | 26 | ○ |
| | | Cu—10Ni | 30 | ☉ | 26 | ☉ | 0 | ☉ | 0 | ☉ |
| | | Cu—15Ni | 29 | ☉ | 26 | ☉ | 0 | ☉ | 0 | ☉ |
| | | Cu—20Ni | 30 | ☉ | 12 | ○ | 5 | ○ | 12 | ○ |
| Comparative Examples | | Cu | 31 | ☉ | 0.1 | X | 31 | X | 75 | X |

As shown in Table 3, for the bonding strength at room temperature, both Examples and Comparative Example showed a bonding strength of 20 Nmm⁻² or greater and were found to have a practical strength.

On the other hand, for the bonding strength at 260° C., Comparative Examples had an insufficient bonding strength of 0.1 Nmm⁻², far below 2 Nmm⁻², while Examples retained a bonding strength of 5 to 26 Nmm⁻², greater than 2 Nmm⁻², and were found to have a practical strength. Particularly, Examples showed a high bonding strength of 24 to 26 Nmm⁻² and were found to have excellent strength in high temperature when the second metal was Cu-10 to 15Mn and when the second metal was Cu-10 to 15Ni.

For the remaining first metal component rate, Comparative Example had a rate greater than 30% by volume while Examples all had a rate of 30% by volume or less, and Examples had a remaining first metal component rate of 0% by volume when the second metal was Cu-10 to 15Mn and when the second metal was Cu-10 to 15Ni. For the conductive material runoff failure rate, Comparative Example had a rate of 70% or greater while Examples all had a rate of 50% or less, and further Examples had a conductive material runoff failure rate of 0% when the second metal was Cu-10 to 15Mn and Cu-10 to 15Ni, and Examples were found to have high heat resistance.

Example 4

A powder of Sn-3Ag-0.5Cu was prepared as the first metal powder. The average particle size of the first metal powder was 25 μm.

A powder of a Cu-10Mn alloy and Cu (Comparative Example) were prepared as the second metal powder. The average particle size of the second metal powder was 15 μm. The particle size of the second metal powder was changed so that the specific surface area was 0.03 to 0.06 m²·g⁻¹.

As the flux, one having a compounding ratio of rosin: 74% by weight, diethylene glycol monobutyl ether: 22% by weight, triethanolamine: 2% by weight and hydrogenated castor oil: 2% by weight was prepared.

A conductive material was prepared by mixing the above-mentioned first metal powder, second metal powder and flux.

For the compounding ratio of the flux, the ratio of the flux to the entire conductive material was 10% by weight.

The compounding ratio of the first metal powder and the second metal powder was adjusted so that the volume ratio of the first metal powder/second metal powder was 60/40 (i.e. second metal powder: 40% by volume).

For the conductive material thus prepared, the bonding strength, the remaining first metal component rate and the conductive material runoff failure rate were measured in the same manner as in Example 1 to evaluate characteristics.

Evaluations of the bonding strength, the remaining first metal component rate and the conductive material runoff failure rate were carried out on the basis of the same criteria as in Example 2 described above.

Table 4 shows the bonding strength of each joined body (room temperature, 260° C.), the remaining first metal component rate, the conductive material runoff failure rate and the evaluation results thereof.

TABLE 4

| | First metal component (60% by volume) | Second metal component (40% by volume) | Specific surface area (m²·g⁻¹) | Evaluation of bonding strength (room temperature) Bonding strength (Nmm⁻²) | Evaluation | Evaluation of bonding strength (260° C.) Bonding strength (Nmm⁻²) | Evaluation | Evaluation of remaining components Remaining first metal component rate (% by volume) | Evaluation | Evaluation of runoff Runoff failure rate (%) | Evaluation |
|---|---|---|---|---|---|---|---|---|---|---|---|
| Examples | Sn—3Ag—0.5Cu | Cu—10Mn | 0.06 | 29 | ⊙ | 24 | ⊙ | 0 | ⊙ | 0 | ⊙ |
| | | | 0.05 | 31 | ⊙ | 21 | ⊙ | 0 | ⊙ | 0 | ⊙ |
| | | | 0.04 | 25 | ⊙ | 16 | ○ | 6 | ○ | 10 | ○ |
| | | | 0.03 | 28 | ⊙ | 14 | ○ | 9 | ○ | 15 | ○ |
| Comparative Examples | | Cu | 0.06 | 31 | ⊙ | 0.1 | X | 31 | X | 75 | X |

As shown in Table 4, for the bonding strength at room temperature, both Examples and Comparative Example showed a bonding strength of 20 Nmm·⁻² or greater and were found to have a practical strength.

On the other hand, for the bonding strength at 260° C., Comparative Example had an insufficient bonding strength of 0.1 Nmm⁻², far below 2 Nmm⁻², while Examples retained a bonding strength of 14 to 24 Nmm⁻², greater than 2 Nmm⁻², and were found to have a practical strength. Further, Examples showed a bonding strength of 21 Nmm⁻² or greater and had particularly high strength in high temperature when the specific surface area of Cu-10Mn, i.e. the second metal, was 0.05 m²·g⁻¹ or greater.

For the remaining first metal component rate, Comparative Example had a rate greater than 30% by volume while Examples all had a rate of 30% by volume or less, and Examples had a remaining first metal component rate of 0% by volume when the specific surface area of Cu-10Mn, i.e. the second metal, was 0.05 m²·g⁻¹ or greater. For the conductive material runoff failure rate, Comparative Example had a rate of 70% or greater while Examples all had a rate of 50% or less, and Examples further had a conductive material runoff failure rate of 0% when the specific surface area of Cu-10Mn, i.e. the second metal, was 0.05 m²·g⁻¹ or greater, and Examples were found to have high heat resistance.

Example 5

A conductive material was prepared by mixing a metal powder of (a) a mixture of a Sn-plated Cu-10Mn alloy and a Sn powder, (b) a mixture of a Sn-plated Cu-10Mn alloy, a Sn powder and a Cu-10Mn alloy or (c) a Sn-plated Cu-10Mn alloy alone, with a flux.

For comparison, a conductive material was prepared by mixing a metal powder of (d) a mixture of a Sn-plated Cu powder and a Sn powder, (e) a mixture of a Sn-plated Cu, a Sn powder and a Cu powder or (f) a Sn-plated Cu powder, with a flux.

Except for the case where the Sn-plated Cu-10Mn alloy alone was used and the case where the Sn-plated Cu powder was used (Comparative Examples), the compounding ratio of the first metal powder and the second metal powder was adjusted so that the volume ratio of the first metal powder/second metal powder was 60/40 (i.e. second metal powder: 40% by volume).

However, for the Sn-plated Cu-10Mn alloy alone, the total ratio of the Cu—Mn alloy (second metal) was 80%. The total ratio of Cu (second metal) was also 80% when the Sn-plated Cu powder was used (Comparative Example).

As the flux, one having a compounding ratio of rosin: 74% by weight, diethylene glycol monobutyl ether: 22% by weight, triethanolamine: 2% by weight and hydrogenated castor oil: 2% by weight was used.

For the compounding ratio of the flux, the ratio of the flux to the entire conductive material was 10% by weight.

For the conductive material thus prepared, the bonding strength, the remaining first metal component rate and the conductive material runoff failure rate were measured in the same manner as in Example 1 to evaluate characteristics.

Evaluations of the bonding strength, the remaining first metal component rate and the conductive material runoff failure rate were carried out on the basis of the same criteria as in Example 2 described above.

Table 5 shows the bonding strength of each joined body (room temperature, 260° C.), the remaining first metal component rate, the conductive material runoff failure rate and the evaluation results thereof.

TABLE 5

| | Powder consisting of first metal component | Powder consisting of second metal component coated with first metal component | Powder consisting of second metal component | Total amount (% by volume) of first metal component | Total amount (% by volume) of second metal component | Evaluation of bonding strength (room temperature) Bonding strength (Nmm$^{-2}$) | Evaluation | Evaluation of bonding strength (260° C.) Bonding strength (Nmm$^{-2}$) | Evaluation | Evaluation of remaining components Remaining first metal component rate (% by volume) | Evaluation | Evaluation of runoff Runoff failure rate (%) | Evaluation |
|---|---|---|---|---|---|---|---|---|---|---|---|---|---|
| Examples | Sn | Sn-coated Cu—10Mn | — | 60 | 40 | 27 | ⊙ | 24 | ⊙ | 0 | ⊙ | 0 | ⊙ |
| | Sn | Sn-coated Cu—10Mn | Cu—10Mn | | | 29 | ⊙ | 24 | ⊙ | 0 | ⊙ | 0 | ⊙ |
| | — | Sn-coated Cu—10Mn | — | 20 | 80 | 27 | ⊙ | 26 | ⊙ | 0 | ⊙ | 0 | ⊙ |
| Comparative Examples | Sn | Sn-coated Cu | — | 60 | 40 | 28 | ⊙ | 0.1 | X | 31 | X | 71 | X |
| | Sn | Sn-coated Cu | Cu | | | 25 | ⊙ | 0.1 | X | 39 | X | 77 | X |
| | — | Sn-coated Cu | — | 20 | 80 | 28 | ⊙ | 0.1 | X | 43 | X | 84 | X |

As shown in Table 5, for the bonding strength at room temperature, both Examples and Comparative Examples showed a bonding strength of 20 Nmm$^{-2}$ or greater and were found to have a practical strength.

On the other hand, for the bonding strength at 260° C., Comparative Examples had an insufficient bonding strength of 0.1 Nmm$^{-2}$, far below 2 Nmm$^{-2}$, while Examples retained a bonding strength of 24 to 26 Nmm$^{-2}$, greater than 2 Nmm$^{-2}$, and were found to have a practical strength. Hence, it was found that high strength in high temperature was obtained as in the case of Examples described above even when the first metal was plated (coated) on the surface of the second metal.

For the remaining first metal component rate, Comparative Examples had a rate greater than 30% by volume, while Examples all had a rate of 0% by volume. For the conductive material runoff failure rate, Comparative Examples had a rate of 70% or greater while Examples all had a rate of 0%, and Examples were found to have high heat resistance even when the first metal was plated (coated) on the surface of the second metal.

Example 6

A powder of Sn-3Ag-0.5Cu was prepared as the first metal powder. The average particle size of the first metal powder was 25 μm.

A powder of a Cu-10Mn alloy was prepared as the second metal powder. The average particle size of the second metal powder was 15 μm. For comparison, a Cu powder was prepared as the second metal powder.

As the flux, a flux with a resin added thereto and a flux with no resin added thereto were prepared.

As the flux with no resin added thereto, general flux A having a compounding ratio of rosin: 74% by weight, diethylene glycol monobutyl ether: 22% by weight, triethanolamine: 2% by weight and hydrogenated castor oil: 2% by weight was prepared.

For the flux with a resin added thereto, thermosetting resin-compounded flux B with a thermosetting resin and a curing agent added to the general flux A and thermoplastic resin-compounded flux C with a thermoplastic resin added to the general flux A were prepared.

Thermosetting resin-compounded flux B contains the flux A, the thermosetting resin (bisphenol A type epoxy resin) and the curing agent at the ratio described below.

Flux A: 30% by weight
Thermosetting resin: 40% by weight
Curing agent: 30% by weight Thermoplastic resin-compounded flux C contains the flux A and the thermoplastic resin (polyamide resin) at the ratio described below.

Flux A: 30% by weight
Thermoplastic resin (polyamide resin): 70% by weight

Then, following conductive materials were prepared:

(1) a conductive material incorporating the flux A with no resin added thereto at such a ratio that the ratio of the flux to the entire conductive material is 10% by weight (Example No. 3 in Table 6);

(2) a conductive material incorporating thermosetting resin-compounded flux B at such a ratio that the ratio of the flux to the entire conductive material is 25% by weight (Example No. 1 in Table 6); and (3) a conductive material incorporating thermoplastic resin-compounded flux C at such a ratio that the ratio of the flux to the entire conductive material is 25% by weight (Example No. 2 in Table 6).

As a conductive material of Comparative Example, a conductive material with the above-mentioned Cu powder used as the second metal was prepared. In this conductive material, the flux A with no resin added thereto was incorporated at such a ratio that the ratio of the flux to the entire conductive material is 10% by weight.

For these conductive materials, the bonding strength, the remaining first metal component rate and the conductive material runoff failure rate were measured in the same manner as in Example 1 to evaluate characteristics.

Table 6 shows the bonding strength of each joined body (room temperature, 260° C.), the remaining first metal component rate, the conductive material runoff failure rate and the evaluation results thereof.

TABLE 6

| | First metal component (60% by volume) | Second metal component (40% by volume) | Presence/absence of resin in flux | Evaluation of bonding strength (room temperature) Bonding strength (Nmm$^{-2}$) | Evaluation | Evaluation of bonding strength (260° C.) Bonding strength (Nmm$^{-2}$) | Evaluation | Evaluation of remaining components Remaining first metal component rate (% by volume) | Evaluation | Evaluation of runoff Runoff failure rate (%) | Evaluation |
|---|---|---|---|---|---|---|---|---|---|---|---|
| Examples No.1 | Sn—3Ag—0.5Cu | Cu—10Mn | Present (bisphenol A epoxy resin) (flux B) | 35 | ⊙ | 33 | ⊙ | 0 | ⊙ | 0 | ⊙ |
| Examples No.2 | | | Present (polyamide resin) (flux C) | 32 | ⊙ | 30 | ⊙ | 0 | ⊙ | 0 | ⊙ |
| Examples No.3 | | | Absent (flux A) | 28 | ⊙ | 24 | ⊙ | 0 | ⊙ | 0 | ⊙ |
| Comparative Examples | Sn—3Ag—0.5Cu | Cu | Absent (flux A) | 25 | ⊙ | 0.1 | X | 31 | X | 75 | X |

As shown in Table 6, for the bonding strength at room temperature, both Examples and Comparative Example showed a bonding strength of 20 Nmm$^{-2}$ or greater and were found to have a practical strength.

On the other hand, for the bonding strength at 260° C., Comparative Example had an insufficient bonding strength of 0.1 Nmm$^{-2}$, far below 2 Nmm$^{-2}$, while Examples retained a bonding strength of 24 to 33 Nmm$^{-2}$, greater than 2 Nmm$^{-2}$, and were found to have a practical strength.

For the remaining first metal component rate, Comparative Examples had a rate greater than 30% by volume, while Examples all had a rate of 0% by volume. For the conductive material runoff failure rate, Comparative Examples had a rate of 70% or greater, while Examples all had a rate of 0%, and were found to have high heat resistance even when a resin was added.

In Examples described above, the present invention has been described taking as an example the case where the lattice constant of the intermetallic compound is greater than the lattice constant of the second metal, but theoretically, the present invention can also be constituted such that the lattice constant of the second metal is greater than the lattice constant of the intermetallic compound. In this case, by ensuring that the lattice constant difference is 50% or greater, diffusion of the first metal and the second metal rapidly proceeds, their change into an intermetallic compound having a higher melting point is facilitated, and almost no first metal component remains, thus making it possible to establish bonding with increased strength in high temperature.

[Alternative]

Figure 3B:
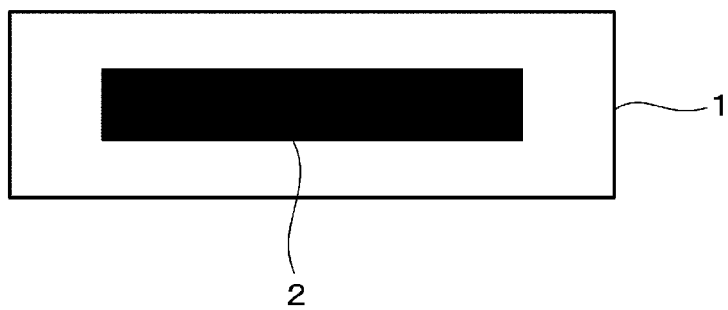
Figures 4A, 4B:
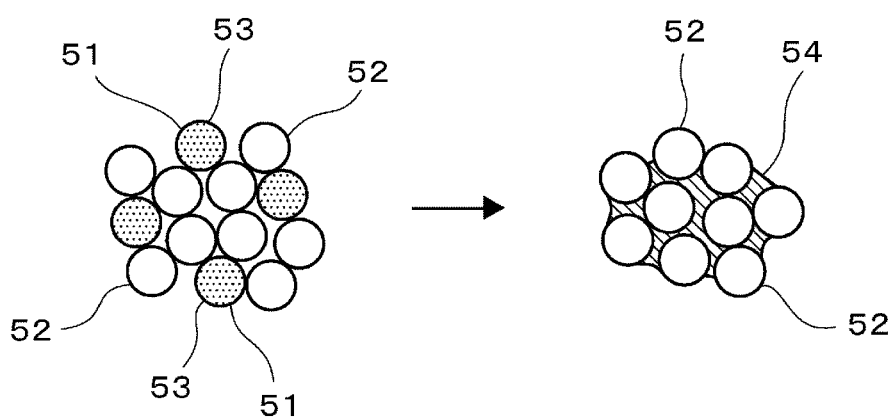

The conductive material of the present invention can also be formed as foam solder as schematically shown in, for example, FIGS. 3(a) and 3(b).

The foam solder in FIG. 3(a) is foam solder having the powdered second metal 2 dispersed in the tabular first metal 1.

The foam solder in FIG. 3(b) is foam solder having the powdered second metal 2 included in the tabular first metal 1.

When used as foam solder shown in FIGS. 3(a) and 3(b), the conductive material of the present invention achieves an effect comparable to that achieved when it is used as so called a solder paste prepared by mixing the first metal, the second metal and the flux as shown in Examples described above.

The aspect of dispersing or including the second metal in the first metal is not limited to the aspect in FIG. 3(a) or 3(b), but can be any other aspect.

The present invention is not limited to Examples described above, and various modifications and changes can be made within the scope of the invention as to the type and composition of the first metal and the second metal constituting the conductive material, the compounding ratio of the first metal and the second metal, the components of the flux and the compounding ratio of the flux, and so on.

Various modifications and changes can be made within the scope of the invention as to the type of an object to be bonded using the present invention, conditions in a bonding step and so on.

In other respects, various modifications and changes can be made as well within the scope of the invention.

DESCRIPTION OF REFERENCE SYMBOLS 1 first metal
2 second metal
3 intermetallic compound
4 joint
11a, 11b a pair of electrodes (object to be bonded)
10 conductive material

The invention claimed is:
1. A conductive material comprising:
a metal component consisting of a first metal and a second metal, the second metal having a melting point higher than that of the first metal, wherein
the first metal is one of Sn and an alloy containing 70% by weight or more of Sn,
the second metal is a Cu—Mn alloy in which a ratio of Mn to the second metal is 5 to 30% by weight, forms an intermetallic compound having a melting point of 310°

C. or higher with the first metal, and has a lattice constant difference of 50% or greater, and the conductive material contains no other metals that react with the first metal or the second metal.

2. The conductive material according to claim 1, further comprising a flux component.

3. The conductive material according to claim 1, wherein the first metal is one of Sn and an alloy containing 85% by weight or more of Sn.

4. The conductive material according to claim 1, wherein a ratio of the second metal to the metal component is 30% by volume or greater.

5. The conductive material according to claim 1, wherein the first metal is one of Sn alone and an alloy containing at least one selected from the group consisting of Cu, Ni, Ag, Au, Sb, Zn, Bi, In, Ge, Al, Co, Mn, Fe, Cr, Mg, Mn, Pd, Si, Sr, Te and P and Sn.

6. The conductive material according to claim 1, wherein the second metal has a specific surface area of $0.05\ m^2 \cdot g^{-1}$ or greater.

7. The conductive material according to claim 1, wherein at least a portion of the first metal is coated on the circumference of the second metal.

8. A method of bonding an object comprising heating the conductive material according to claim 1 so as to form the intermetallic compound and bond the object.

9. A bonded structure in which an object to be bonded is bonded using the conductive material according to claim 1, the bonded structure comprising a joint, through which the object to be bonded is bonded, having as main components, the second metal derived from the conductive material and an intermetallic compound containing the second metal and Sn, and the ratio of the first metal derived from the conductive material to the entire metal component is 30% by volume or less.

10. The bonded structure according to claim 9, wherein the intermetallic compound is comprises a Cu—Mn alloy and one of Sn alone and an alloy containing at least one selected from the group consisting of Cu, Ni, Ag, Au, Sb, Zn, Bi, In, Ge, Al, Co, Mn, Fe, Cr, Mg, Mn, Pd, Si, Sr, Te and P and Sn.

11. The bonded structure according to claim 10, wherein the Cu—Mn alloy is the second metal derived from the conductive material.

12. The bonded structure according to claim 10, wherein the one of Sn alone and the alloy is the first metal derived from the conductive material.

13. A conductive material comprising:

a metal component consisting of a first metal and a second metal, the second metal having a melting point higher than that of the first metal, wherein the first metal is one of Sn and an alloy containing 70% by weight or more of Sn, the second metal is a Cu—Ni alloy in which a ratio of Ni to the second metal is 5 to 20% by weight, forms an intermetallic compound having a melting point of 310° C. or higher with the first metal, and has a lattice constant difference of 50% or greater, and the conductive material contains no other metals that react with the first metal or the second metal.

14. The conductive material according to claim 13, further comprising a flux component.

15. The conductive material according to claim 13, wherein the first metal is one of Sn and an alloy containing 85% by weight or more of Sn.

16. The conductive material according to claim 13, wherein a ratio of the second metal to the metal component is 30% by volume or greater.

17. The conductive material according to claim 13, wherein the first metal is one of Sn alone and an alloy containing at least one selected from the group consisting of Cu, Ni, Ag, Au, Sb, Zn, Bi, In, Ge, Al, Co, Mn, Fe, Cr, Mg, Mn, Pd, Si, Sr, Te and P and Sn.

18. The conductive material according to claim 13, wherein the second metal has a specific surface area of $0.05\ m^2 \cdot g^{-1}$ or greater.

19. The conductive material according to claim 13, wherein at least a portion of the first metal is coated on the circumference of the second metal.

20. A method of bonding an object comprising heating the conductive material according to claim 13 so as to form the intermetallic compound and bond the object.

21. A bonded structure in which an object to be bonded is bonded using the conductive material according to claim 13, the bonded structure comprising a joint, through which the object to be bonded is bonded, having as main components, the second metal derived from the conductive material and an intermetallic compound containing the second metal and Sn, and the ratio of the first metal derived from the conductive material to the entire metal component is 30% by volume or less.

22. The bonded structure according to claim 21, wherein the intermetallic compound is comprises a Cu—Ni alloy and one of Sn alone and an alloy containing at least one selected from the group consisting of Cu, Ni, Ag, Au, Sb, Zn, Bi, In, Ge, Al, Co, Mn, Fe, Cr, Mg, Mn, Pd, Si, Sr, Te and P and Sn.

23. The bonded structure according to claim 22, wherein the Cu—Ni alloy is the second metal derived from the conductive material.

24. The bonded structure according to claim 22, wherein the one of Sn alone and the alloy is the first metal derived from the conductive material.

* * * * *